TAPE HANDLING SYSTEM

Filed July 9, 1965 5 Sheets-Sheet 1

Inventors
FRANCISCUS M. MICHIELS
ROGER L. J. LAUREYS
CHARLES L. H. VAN ROOSBROECK
By [signature]
Attorney March 21, 1967 F. M. MICHIELS ETAL 3,310,250

TAPE HANDLING SYSTEM

Filed July 9, 1965 5 Sheets-Sheet 2

Inventors
FRANCISCUS M. MICHIELS
ROGER L. J. LAUREYS
CHARLES L. H. VAN ROOSBROECK
By [signature]
Attorney Inventors
FRANCISCUS M. MICHIELS
ROGER L. J. LAUREYS
CHARLES L. H. VAN ROOSBROECK
By
Attorney Inventors
FRANCISCUS M. MICHIELS
ROGER L. J. LAUREYS
CHARLES L. H. VAN ROOSBROECK
By
Attorney

TAPE HANDLING SYSTEM

Filed July 9, 1965

5 Sheets-Sheet 5

Inventors
FRANCISCUS M. MICHIELS
ROGER L. J. LAUREYS
CHARLES L. H. VAN ROOSBROECK
By [signature]
Attorney United States Patent Office 3,310,250
Patented Mar. 21, 1967

3,310,250
TAPE HANDLING SYSTEM

Franciscus Marcel Michiels, Antwerp, Roger Leon Jean Laureys, Schilde-Antwerpen, and Charles Louis Henri Van Roosbroeck, Willebroek, Belgium, assignors to International Standard Electric Corporation, New York, N.Y., a corporation of Delaware Filed July 9, 1965, Ser. No. 470,669
Claims priority, application Belgium, July 23, 1964, 64/08425
20 Claims. (Cl. 242—55.12)

The present invention relates to a tape handling system including a processing member, at least one multiple tape loop, first tape driving means for moving said tape across said processing member, a single tape loop between said multiple tape loop and the entrance of said tape in said processing member and loop producing means for producing said single web loop.

Such a system is already known from the U.S. Patent No. 3,016,207. Therein said first tape driving means include an idler-drive roll pair, and said loop producing means are vacuum producing means. Further, between said single tape loop and said multiple tape loop is mounted a freely rotatable roller. This known system is not adapted to operate at high speeds, e.g. with a tape velocity of 5 m./sec., especially due to the idler-drive roll pair being not able to suddenly accelerate the web. But even when these idler-drive roll pair would be replaced by means permitting such a sudden acceleration, e.g. capstans to which are associated valves controlling the creation of a vacuum inside the capstans in order to suck the tape against these capstans, the thus modified system would still not be able to operate at high speeds. Indeed, in order that the inertia presented by said single tape loop should be small, the suction exerted thereon may not be too large, but as a result of this, when the tape is suddenly accelerated by said first driving means the single small loop may disappear. When this happens the first driving means will then have to conquer the inertia presented by the multiple loop, this inertia being largely due to the presence of tensioning members. This is obviously a serious drawback. This drawback is somewhat diminished by providing a plurality of small single loops in the immediate proximity of said processing member. Such a system is however bulky since it requires a relatively large number of vacuum chambers. Moreover, such a system is also not adapted to operate at high speeds. Indeed, the small single loops are maintained by means of reel motors controlled by photo-electric cells, and when these single loops suddenly disappear these reel motors are not able to produce new such loops at a high speed due to the fact that the reel motors always present a relatively large inertia.

It is therefore an object of the present invention to provide a tape handling system of the above type which is able to operate at high speeds e.g. with a linear tape speed of 5 meters per second.

The tape handling system according to the invention is characterized in that said loop producing means are constituted by second tape driving means and control means therefor, that said second tape driving means are arranged between said multiple tape loop and said single tape loop and communicate to said tape a linear velocity the absolute value of which is at least equal to the absolute value of the linear velocity communicated to said tape by said first tape driving means, and that said control means control said second tape driving means to maintain the length of said single tape loops between two predetermined values.

The invention also relates to a tape handling system including a processing member, at least one multiple tape loop stored in a bin and tape driving means for moving said tape across said processing member, characterized in that it includes control means constituted by photoelectric cells and associated light sources and mirrors, for controlling the quantity of tape of said multiple tape loop stored in said bin, by controlling the operation of said driving means, that each photoelectric cell and the associated light source, on the one hand, and the associated mirror, on the other hand, are mounted on the one and other sides of the edges of said multiple tape loop in such a manner that the mirror is perpendicular to the plane of the tape and that the light emitted by said light source is able to be reflected by the associated mirror and to influence the associated photoelectric cell, and that each of the beams of said light source is located in a plane which is oblique with respect to the plane of said tape.

The invention further also relates to a speed control mechanism for a motor including a variable resistance for controlling the voltage applied to the armature of said motor and hence the speed thereof, characterized in that said variable resistance includes a plurality of series connected resistances each of which is connected in parallel with at least one reed switch contact mounted in front of a permanent magnet, a disc being able to be displaced between the reed switch contacts and the permanent magnets so as to short-circuit or not one or more of said resistances in such a manner that said speed of said motor remains substantially constant.

Finally, the invention also relates to a potentiometer constituted by a plurality of series connected resistances, characterized in that each of said resistances is connected in parallel with at least one reed switch contact mounted in front of a permanent magnet, a disc being able to be displaced between the reed switch contacts and the permanent magnets so as to short-circuit or not one or more of said resistances.

The above mentioned and other objects and features of the invention will become more apparent and the invention itself will be best understood by referring to the following description of an embodiment taken in conjunction with the accompanying drawings in which.

Figure 1:
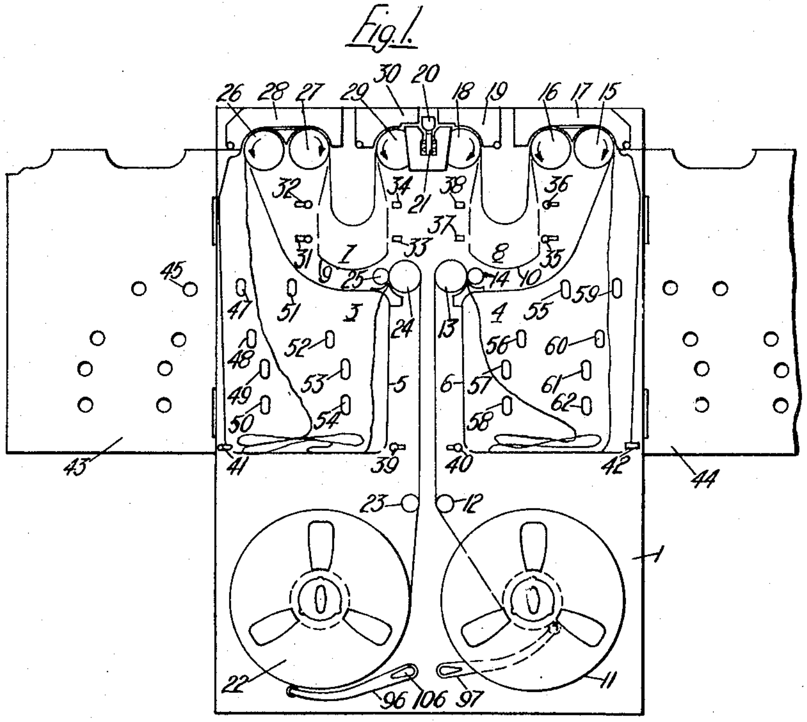
FIG. 1 is a front view of a web handling system according to the invention.

Principally referring to FIG. 1, the flat-shaped bin 1 has an inner width which is slightly larger than that of the magnetic web or tape 2. This bin comprises two large tape containers 3, 4 enclosed by the respective walls 5, 6 and two small tape containers 7, 8 enclosed by the respective walls 9, 10. The tape 2 is passed from the tape reel 11 over the idler roller 12, the conveyor roller 13, against which the tape 2 is pressed by a pinch roller 14, through the wall 6 into the large container 4 wherein a certain quantity of tape is loosely stored. From this large container 4 the tape 2 is passed on the auxiliary capstans 15, 16, against which it is pressed by a pivoted member 17 the lower surface of which is covered with a layer of felt, into the small container 8 wherein a small single loop is formed. Further the tape 2 is passed between the main capstan 18 and a pivoted pressing member 19, the lower surface of which is also covered with a layer of felt, towards the magnetic reading and play-back head 20 against which it is pressed by the cushion member 21.

From the magnetic head 20 the tape 2 is passed towards the tape reel 22 in an analogous manner as above described via corresponding elements 30, 29, 28, 27, 26, 25, 24 and 23.

Figure 2:
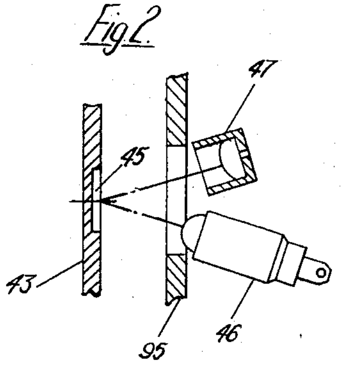
FIG. 2 is a detailed view of a photoelectric sensing device used in the system of FIG. 1.
Figure 3:
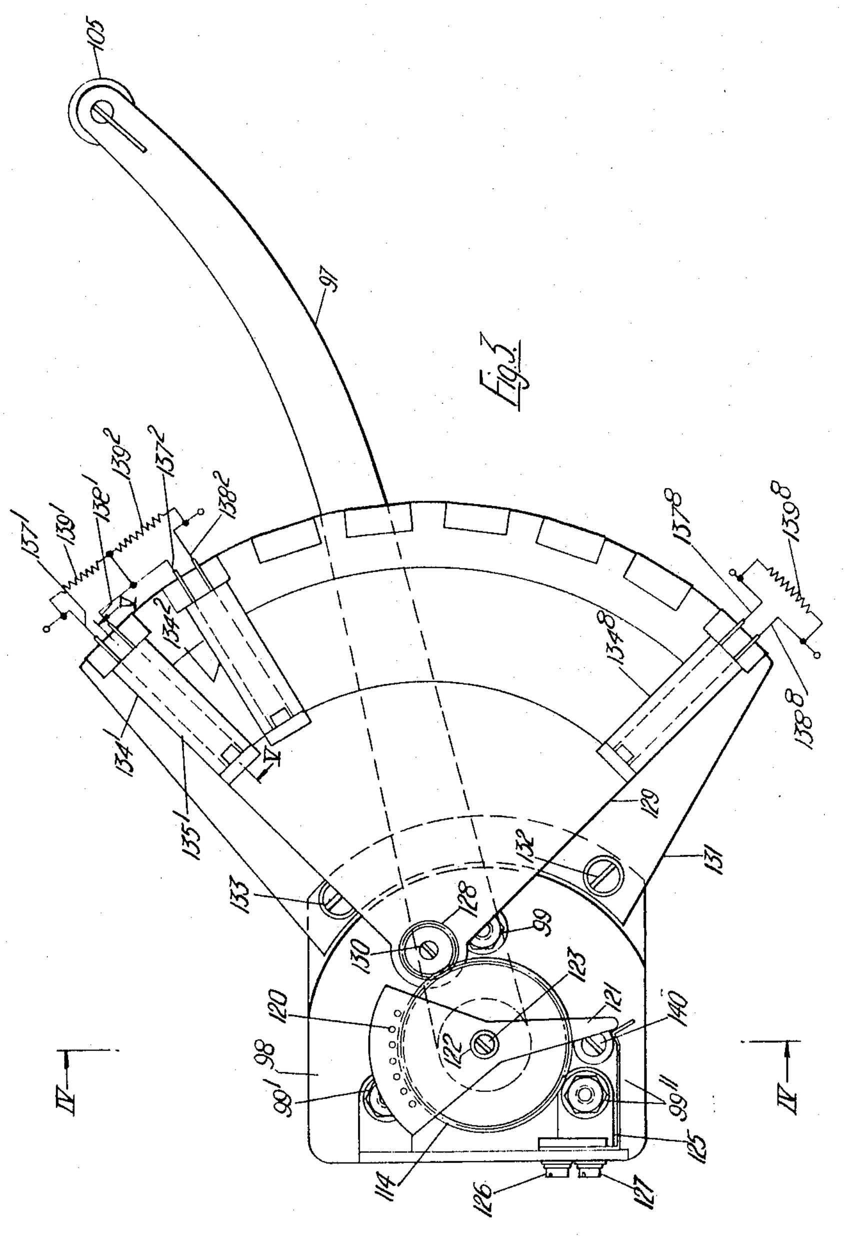
FIG. 3 is a front view of a reel speed control device used in the system of FIG. 1.

As mentioned above small single tape loops are formed in the small containers 7 and 8 respectively. Light sources 31, 32 are mounted at different levels behind openings in the lateral walls 9 of the small container 7 and photoelectric cells 33, 34 are arranged behind openings in the same wall 9 at corresponding levels, so as to be able to cooperate with the respective light sources 31 and 32. The light sources 35, 36 and the photo-electric cells 37, 38 are mounted in an analogous manner with respect to the wall 10 of the small container 8. In the lower part of the large containers 3 and 4 are mounted the light sources 39, 40 and the respective associated photo-electric cells 41, 42. In the rear wall 95 of each of these large containers 3, 4 are made eight apertures behind each of which are mounted a photoelectric cell, and a light source which is able to influence this photo-electric cell via a mirror mounted in one of the doors 43, 44. Principally referring to FIG. 2 the photo-electric sensing device mounted behind the upper left aperture in the rear wall 95 of the large container 3 and cooperating wiith the mirror 45 in the door 48 is shown in detail. It includes the light source 46 and the photo-electric cell 47. Hereby it should be noted that the light beam emitted by the light source 46 is not situated in a plane perpendicular to the rear wall 95 of the container 3 but is slightly oblique with respect to that wall, so that it is able to be interrupted by the tape 2 the plane of which is perpendicular to the wall 95. Only the photo-electric cells mounted behind the apertures in the rear walls of the containers 3 and 4 are represented on FIG. 1 and indicated by the reference numbers 47 to 62. The conveyor roller 24 and the associated pitching roller 25, and the conveyor roller 13 and the associated pitching roller 14, form part of automatic self-regulating tape tensioning devices of the type disclosed in the Belgian Patent 629,563 (W. Fischer-D. Schafer 2–1). These devices have the advantage of functioning effectively without the intervention of sensing devices and electrical switches, to maintain constant the tension in the tape independently of the direction of motion of the tape.

The main capstans 18 and 29 are coupled to the same synchronous motor (not shown) which is able to drive these capstans in the directions shown at a constant linear velocity of e.g. 5 meters per second. The auxiliary capstans 15, 16, 26 and 27 are coupled to another motor (not shown) which is able to drive these capstans in the directions shown at a substantially linear velocity the absolute value of which is somewhat larger than that of the main capstans 18, 29 e.g. this linear velocity is equal to 5.3 meters per second. The main and auxiliary capstans are of a well known type; at the inside of them a vacuum may be created in order to apply the tape 2 against the rotors of these capstans. This happens under the control of an electrically controlled pneumatic valve of the type disclosed in the Belgian Patent No. 595,059 (H. Castelijns 2).

Figure 4:
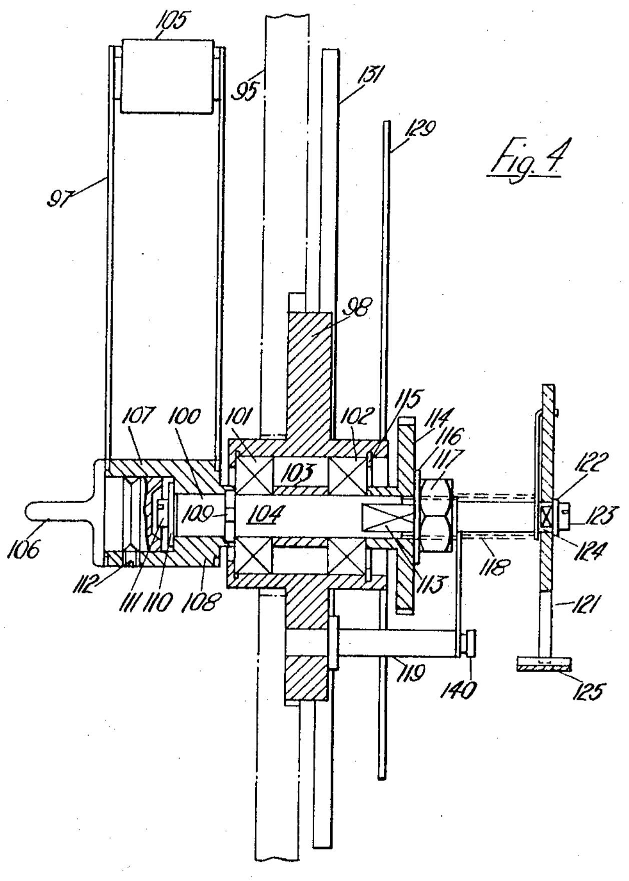
FIG. 4 is a cross-sectional view along the line IV—IV of FIG. 3.
Figure 5:
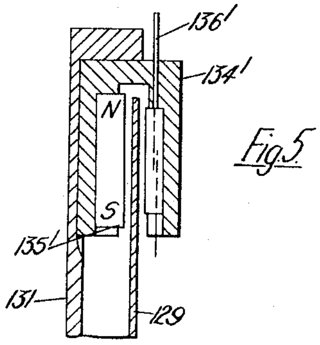
FIG. 5 is a cross-sectional view along the line V—V of FIG. 3.
Figure 6:
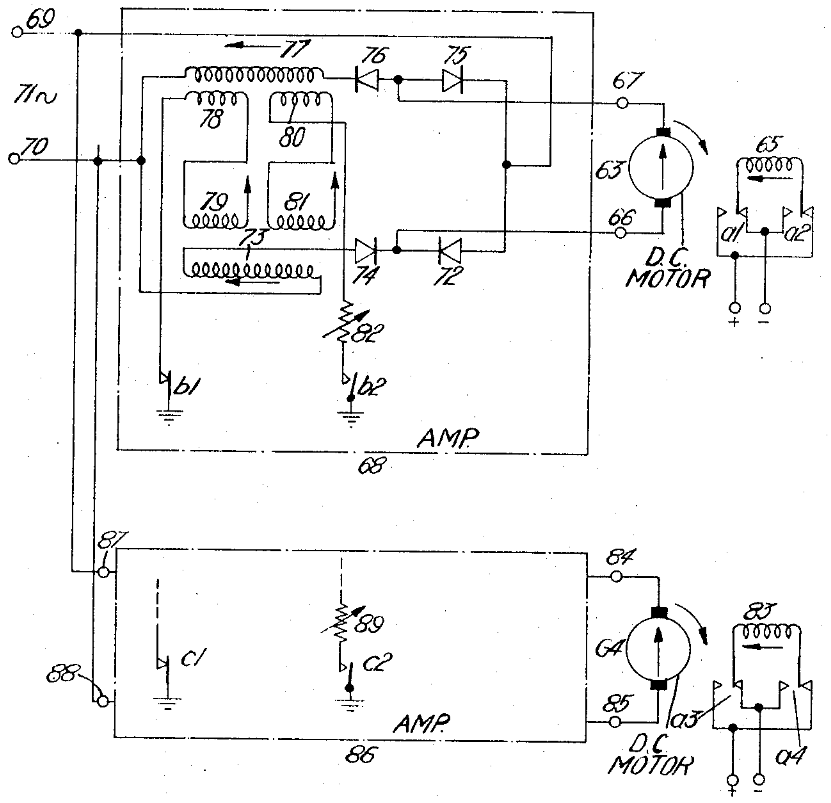
FIG. 6 and FIG. 7 represent the electric control circuit used in the system of FIG. 1.

Principally referring to the FIGURES 3 to 7, behind the above rear wall 95, which is only represented in FIG. 4, are mounted two identical control mechanisms (FIGS. 3 to 5) for controlling, each in cooperation with a magnetic amplifier circuit 68, 86 (FIG. 6), the speeds of the motors 63 and 64 (FIG. 6), driving the respective reels 11 and 22. These mechanisms include the follower arms 97 and 96 (FIG. 1) the rollers at the ends of which rest on the tape wound on the respective reels 11, 22 since these control mechanisms are identical, only the one controlling the speed of the reel motor 63 will hereinafter be described in detail. This control mechanism includes a mounting block 98 which is fixed on the rear wall 95 by means of the nuts 99, 99′, 99″. This mounting block 98 has a control hollow part and two lateral circular apertures through which extends the axle 100 surrounded by the ball bearings 101 and 102 separated by a ring 103. The axle 100 is provided, at the left of the ball bearings 101, with a crown of teeth 104 which are perpendicular to the axle. The arm 97 has an opening with a portion 107 having a relatively large diameter and a portion 108 having a relatively small diameter. The portion 108 is slided on the axle 100; it is provided with a number of protruding lips 109 which are engaged between the above teeth 104 on the axle 100 so as to prevent a radial displacement of the arm 96 about this axle 100. In order also to prevent a longitudinal displacement of the arm 96 on the axle 100, this arm 96 is fixed on the axle 100 by means of the washer 110 and the screw 111. A knob 106 is inserted in the above portion 107, the bottom part of this knob 106 being slightly hollowed out so as not to come in contact with the screw 111. This knob 106 is fixed on the arm 96 by means of the screw 112. Substantially in its middle part the axle 100 is provided with a flat surface 113 which prevents the gear wheel 114 mounted thereon to be radially displaced with respect to the axle 100. A resilient ring 115 is inserted in a groove of the mounting block 98 at the right hand of the ball bearing 102. The gear wheel 114 is prevented from being axially displaced along the axle 100 by means of the washer 116 and the nut 117. On the other end of the axle 100 is slided a helical spring 118 which is connected at its one end to a long pin 119 fixed on the mounting block 98 by means of the screw 140. At its other end the spring 118 is inserted in one of the apertures 120 of a piece 121 which is secured to the end of the axle 100 by means of the washer 122 and the screw 123, the end of the axle 100 having a flat surface 124 in order to prevent a radial displacement of the piece 121 with respect to this axle 100. By the choice of the aperture 120 in which the spring 119 is inserted, the tension of this spring may be regulated.

The lower end of the piece 121 makes contact with a blade spring 125 which is fixed on the mounting block 98 by means of the screws 126, 127. At its end the blade spring 125 is provided with a raised portion so that when the arm 97 and hence the piece 121 are rotated in clockwise direction (FIG. 3) in order to be able to remove the reel 11, the end of the piece 121 moves beyond this raised portion and thus locks the arm 97 in position. The gear wheel 114 meshes with the gear wheel 128 which is fixed to a sector-shaped disc 129 which is made in a magnetic material and which is able to freely rotate about a pin fixed on the mounting block 98 by means of the screw 130. A mounting plate 131 is further fixed on the mounting block 98 by means of the screws 132, 133. On the mounting plate 131 eight U-shaped supports 134 ($134^1$ to $134^8$) made in an insulating material are fixed by means of an adhesive, the outer periphery of the disc 129 being located between these U-shaped arms. In the lower parts of each of these U-shaped supports is mounted a permanent magnet 135 ($135^1$ to $135^8$), whereas in the upper parts of each of these supports is mounted a reed switch make contact 136 ($136^1$ to $136^8$) with contact blades 137, 138 ($137^1$ to $137^8$, $138^1$ to $138^8$). A resistance 139 is branched between these contact blades and all the resistances 139 ($139^1$ to $139^8$) are connected in series. When the disc 129 is located between a reed switch make contact 136 and the associated permanent magnet 135 the latter will not be able to close this switch make contact 136 due to the disc 129 being made in a magnetic material. Only when the disc 129 is removed from between the permanent magnet 135 and the associated reed switch contact the latter will be closed. Hence in the position of the follower arm 97 shown the total resistance formed by the eight series connected resistances 139 is maximum whereas in the position of the follower arm 96 (FIG. 1) it is zero.

The above mentioned amplifier circuit 68 which controls the speed of the D.C. motor 63 in cooperation with the above control mechanism, will hereinafter be described.

The field winding 65 of this D.C. motor 63 is connected to the movable armatures of the change-over contacts *a*1, *a*2 of a relay A*r* (FIG. 7), the fixed contact blades of these contacts being connected to a positive and a negative D.C. potential respectively. The armature of the D.C. motor 63 is connected to the output terminals 66, 67 of a magnetic amplifier 68, the input terminals 69, 70 of which are connected to the poles of an A.C. source 71. The input terminals 69 and 70 are connected to the output terminal 66 via the diode 72 and via the series connection of the winding 73 and the diode 74 respectively. The output terminal 67 is connected to the input terminals 69 and 70 via the diode 75 and the series connection of the diode 76 and the winding 77 respectively. The windings 73 and 77 are wound together with the windings 78, 79 and 80, 81 on a same magnetic core with a substantially rectangular hysteresis loop. The series connected windings 78 and 79 are connected in series with the break contact *b*1 of a relay B*r* (FIG. 7) between the poles of a D.C. source and constitute a D.C. bias circuit. Hereby the windings 78, 79 are coupled with the windings 77 and 73 respectively. The series connected windings 80 and 81 are connected in series with the make contact *b*2 of a relay B*r* and a variable resistance 82 between the poles of a D.C. source and constitute a D.C. control circuit. This resistance is constituted by the series connection of a fixed resistance and the series connected resistances 139 shown in FIG. 3. The D.C. bias circuit biases the magnetic core in such a manner that when the control circuit is open the rectified voltage appearing across the armature winding of the D.C. motor 63 is not able to produce a rotation of the latter. When the D.C. control circuit is closed and when the resistance 82 is minimum, the current flowing in this control circuit is maximum and biases the magnetic core in such a manner that the rectified voltage appearing across the armature winding of the D.C. motor 63 is minimum but able to produce a rotation of the latter at a predetermined minimum angular speed. When the resistance 82 increases the current flowing in the D.C. control circuit decreases and biases the magnetic core in such a manner that the rectified voltage appearing across the armature winding of the D.C. motor 63 increases. In order to maintain constant the linear velocity of the tape reel 11 driven by the motor 63, the angular speed of the latter motor 63 must be varied in inverse proportion to the diameter of the tape on the reel 11. Since it follows from the above that this angular speed is proportional to the value of the resistance 82, it is hence sufficient to vary the latter resistance 82 in inverse proportion to the diameter of the tape wound on the reel 11. This is realized by the above control mechanism, since the disc 129 is not engaged between the reed switches 136 and the associated permanent magnets 135 when the tape reel 11 is full, whereas it is gradually engaged therebetween when the diameter of the tape on the reel 11 becomes smaller.

In an analogous manner as described above, the speed of the D.C. motor 64 is controlled by a control mechanism cooperating with the magnetic amplifier circuit 86. This D.C. motor 64 has a field winding 83 which is connected to the movable armatures of the change-over contacts *a*3, *a*4 of the above relay A*r*, the fixed contact blades of these contacts being connected to a positive and negative D.C. potential respectively. The armature of the D.C. motor 64 is connected to the output terminals 84, 85 of a magnetic amplifier circuit 86 the input terminals 87, 88 of which are connected to the poles 69, 70 of the A.C. source 71. This magnetic amplifier circuit 86 inclues two D.C. windings, the first forming part of a D.C. bias circuit including the break contact *c*1 of a relay C*r* (FIG. 7) and the second forming part of a D.C. control circuit including a variable resistance 89 and a make contact *c*2 of the relay C*r*.

Figure 7:
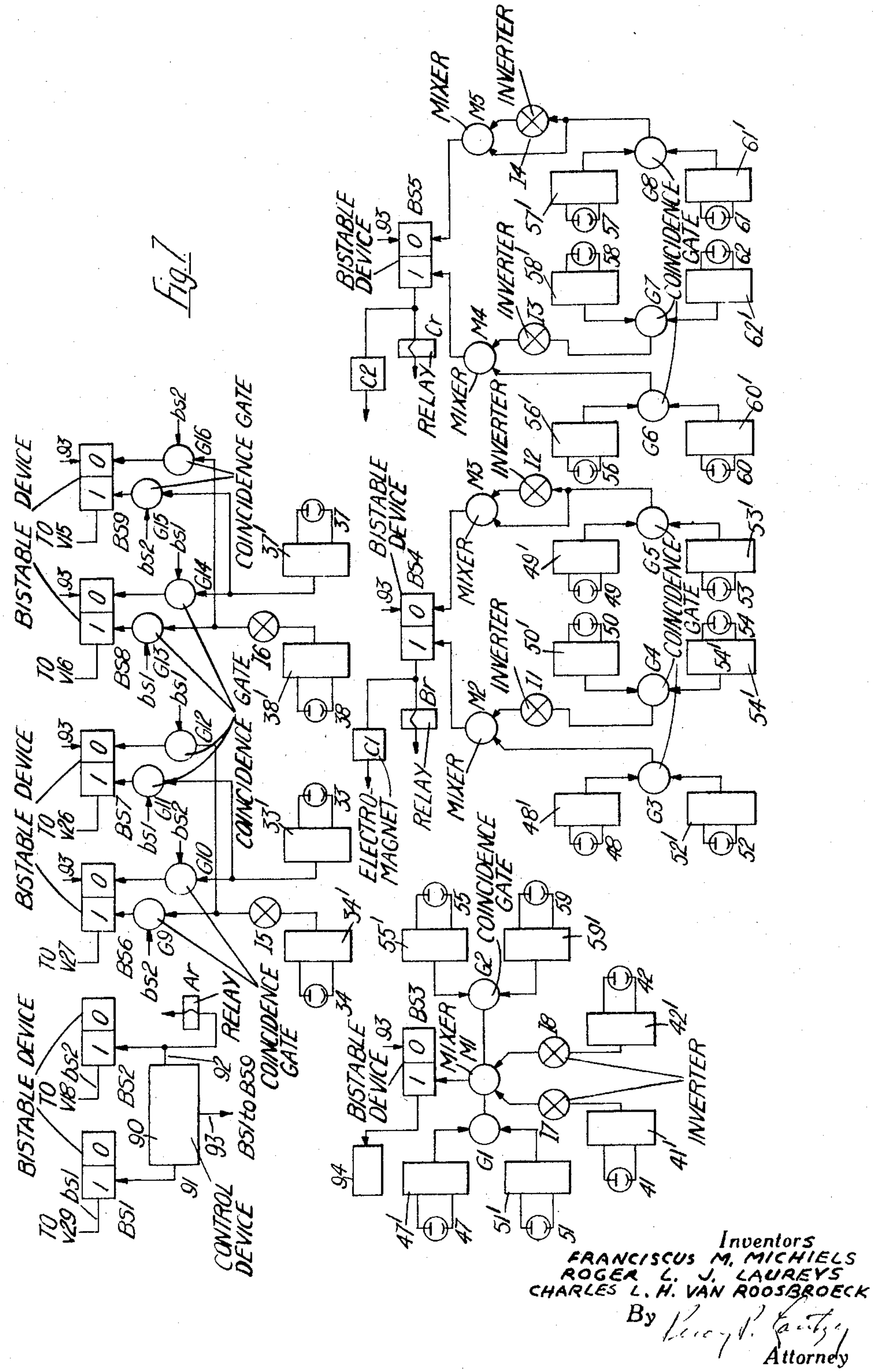

Principally referring to FIG. 7, the electric control circuit of the present tape handling system comprises a general control device 90 having output leads 91, 92 and 93. The output lead 91 is connected to the 1-input of the bistable device BS1, and the output lead 92 is connected to the 1-input of the bistable device BS2 and to the one end of the winding of the relay A*r* the other end of which is connected to a battery. The 1-outputs *bs*1 and *bs*2 of the bistable devices BS1 and BS2 control the operation of the pneumatic valves V29, V18 (not shown) associated to the main capstans 29 and 18 respectively. The output lead 93 is a reset output lead which is connected to the 0-inputs of the above bistable devices BS1 and BS2 and of the bistable devices BS3 to BS9 hereinafter to be described.

Each of the above photo-electric cells 33, 34, 37, 38, 41, 42 and 47 to 62 forms part of a suitable well known operating circuit which is therefore not shown in detail but only indicated by a block and which provides at its output an activating signal when the photo-electric cell is prevented from receiving light from the associated light source. The operating circuits associated to the photo-electric cells are indicated by the same reference as these cells but provided with an accent.

The outputs of the photo-electric cell circuits 47′ and 51′ are connected to the inputs of a two-input coincidence gate G1. Likewise the outputs of the photo-electric cell circuits 55′ and 59′ are connected to the inputs of a two-input coincidence gate G2. The outputs of the coincidence gates G1 and G2 are directly connected to two inputs of a four-input mixer M1, whereas the outputs of the photo-electric cell circuits 41′ and 42′ are connected to the two other inputs of this mixer M1 via the inverters 17 and 18 respectively. The output of the mixer M1 is connected to the 1-input of the bistable device BS3, the 1-output of which is connected to an alarm circuit 94, which when operated cuts the electric supply from the capstan motors and from the reel motors 63, 64.

The outputs of the pairs of photo-electric cell circuits 48′, 52′; 50′, 54′; 49′, 53′; 56′, 60′; 58′, 62′ and 57′, 61′ are connected to the inputs of the two-input coincidence gates G3 to G8 respectively. The output of the gate G3 is directly connected to the input of the two-input mixer M2 the other input of which is connected to the output of the gate G4 via the inverter I1. The output of the mixer M2 is connected to the 1-input of the bistable device BS4 the 1-output of which is connected to the relay B*r* and to the electromagnet C1. The output of the gate G5 is connected to one input of the two-input mixer M3 and to the other input of this mixer M3 via the inverter I2. The output of the mixer M3 is connected to the 0-input of the bistable device BS4. The electromagnet C1 controls an electromagnetic coupling of a well known type between the shaft of the motor 64 and the axle of the reel 22. When the electromagnet C- is operated the reel 22 is forced into contact with a disc fixed on the shaft of the motor 64, whereas when the electromagnet C1 is released the reel 22 is urged into contact with a fixed disc so as to brake the reel 22; also a brake of the motor 64 is operated.

The outputs of the gates G6, G7 and G8 are coupled to the 1- and 0-inputs of the bistable device BS5 in an analogous manner as the gates G3, G4, G5 are connected to the 1- and 0-inputs of the bistable device BS4. The 1-output of the bistable device BS5 is connected to the relay C*r* and to the electromagnet C2 which controls an electromagnetic coupling between the reel 11 and the shaft of motor 63 in the same manner as the electromagnet C1.

It should be noted that the various inputs of the mixers M1 to M5 each include a differentiator circuit of positive steps so that these inputs are normally deactivated even when the outputs of the associated gates G1, G2, G3, G4, G5, G6, G8, the inverters I1 to I4 or the circuits 41′, 42′ are activated and that these inputs are activated only during a short time interval when the corresponding ones of the latter outputs become activated.

The output of the photo-electric cell circuit 34′ is connected, on the one hand, via the inverter I5 to one input of the two-input coincidence gate G9 the other input of which is connected to the 1-output $bs2$ of the bistable device BS2 and, on the other hand, to the one input of the two-input coincidence gate G12 the other input of which is connected to the 1-output $bs1$ of the bistable device BS1. The outputs of the gates G9 and G12 are connected to the 1-input and the 0-input of the bistable devices BS6 and BS7 respectively which when triggered in their 1-condition operate the pneumatic valves V27, V26 (not shown) associated to the capstans 27 and 26 respectively. The output of the photo-electric cell circuit 33' is connected, on the one hand, to one input of the two-input coincidence gate G10 the other input of which is connected to the above 1-output $bs2$ and, on the other hand, to one input of the two-input coincidence gate G11 the other input of which is connected to the above 1-output $bs1$. The outputs of the gates G10 and G11 are connected to the 0-input and the 1-input of the bistable devices BS6 and BS7 respectively.

In an analogous manner the outputs of the photo-electric cell circuits 37', 38' are coupled to the inputs of the bistable devices BS8 and BS9 which when triggered in their 1-condition operate the pneumatic valves V16, V15 (not shown) associated to the capstans 16, 15 respectively.

Referring to the drawings, the operation of the tape handling system will now be described in detail. It is supposed that the general control circuit 90 has received an address and must search on the tape 2 the information corresponding to this address. At the start of such a selecting operation the computer 90 activates its output lead 93 during a short time interval to reset the bistable devices BS1 to BS9 to their 0-condition. It also starts the driving motors of the main and auxiliary capstans and starts comparing the address recorded on the tape portion located in front of the reading head with the address received. From this comparison operation the computer 90 knows in what direction the tape 2 must be displaced and accordingly activates one of its output leads 91 (for the right to left displacement) or 92 (for the left to right displacement). It is supposed that the output lead 91 is activated. In this case the relay $Ar$ is not energized so that when a suitable voltage is applied to the armature windings of the reel motors 63 and 64 the latter will rotate in clockwise direction due to the flux in the field windings 65, 83 having the direction shown. If the output lead 92 is activated the relay $Ar$ is energized so that when a suitable voltage is applied to the armature windings of the reel motors 63 and 64, the latter will rotate in counter-clockwise direction due to the flux in the field windings 65, 83 having then a direction opposite to that shown. It is further supposed that the lower levels of the small loops in the containers 7, 8 are situated between the levels determined by the photo-electric cells 33, 34 and 37, 38 respectively i.e. it is supposed that the photo-electric cells 33 and 37 are illuminated by the associated light sources 31 and 35, whereas the photo-electric cells 34 and 38 are prevented by the tape 2 from being illuminated by the associated light sources 32 and 36. Finally it is supposed that the pairs of photo-electric cells 49, 53 and 57, 61 are prevented from being illuminated and are illuminated by their associated light sources respectively.

Due to the output lead 91 of the computer 90 being activated the bistable device BS1 is triggered in its 1-condition. Consequently the pneumatic valve V29 associated to the main capstan 29 is operated so that the tape 2 is displaced from right to left. Considering the small loop in the container 7, the length of this loop increases due to which the photo-electric cell 33 is at a certain moment prevented from being illuminated by the associated light source 31. Hence the output lead of the photo-electric cell circuit 33' is activated and due to the output lead $bs1$ of the bistable device BS1 being also activated, the output of the gate G11 is activated and the bistable device BS7 is triggered in its 1-condition. Thus the valve V26 is operated so that the auxiliary capstan 26 displaces the tape 2 at a velocity which is higher than that of the main capstan 29. Consequently the length of the small loop in the container 7 decreases so that successively the photo-electric cells 33 and 34 are illuminated. When the photo-electric cell 33 is illuminated by its associated light source 31 nothing happens, but when the photo-electric cell 34 is illuminated by its associated light source 32 the output of the inverter I5 connected to the output of the photo-electric cell circuit 34' is activated and the bistable device BS7 is reset in its 0-condition via the gate G12. Thus the operation of the pneumatic valve V26 is stopped so that the length of the small loop in the container 7 again increases etc.

Considering the small loop in the container 8, the length of this loop decreases due to which the photo-electric cell 38 is at a certain moment illuminated by the associated light source 36. Hence the output lead of the inverter I6 connected to the output of the photo-electric cell circuit 38' is activated and due to the output lead $bs1$ of the bistable device BS1 being also activated, the output of the gate G13 is activated and the bistable device BS8 is triggered in its 1-condition. Thus the valve V16 is operated so that the auxiliary capstan 16 now displaces the tape 2 at a velocity which is higher than that of the main capstan 29. Consequently the length of the small loop in the container 8 increases so that successively the photo-electric cells 38 and 37 are prevented from being illuminated. When the photo-electric cell 38 is illuminated by the associated light source 36 nothing happens, but when photo-electric cell 37 is prevented from being illuminated by the associated light source 35, the output of the photo-electric cell circuit 37' is activated and the bistable device BS8 is reset to its 0-condition via the gate G14. Thus the operation of the pneumatic valve V16 is stopped so that the length of the small loop in the chamber 8 again decreases etc.

It should be noted that the operation time of all the pneumatic valves is much smaller than the time required by the tape 2 to travel, in each small container 7, 8, from its lowest level to its highest level or vice-versa so that there is no danger for oscillations.

Since the tape 2 is displaced from right to left, the quantity of tape increases in the container 3 and decreases in the container 4. Considering the container 3 it has been supposed that the photo-electric cells 49, 53 are not illuminated. Due to the quantity of tape increasing, the photo-electric cells 48, 52 are at a certain moment prevented from being illuminated. Consequently the bistable device BS4 is triggered in its 1-condition via the gate G3 and the mixer M2. Thus the relay $Br$ and the electromagnet C1 are operated. By the operation of the relay $Br$ the D.C. bias circuit of the magnetic amplifier circuit 68 is opened, whereas its D.C. control circuit is closed. Hence the D.C. motor 64 starts rotating in clockwise direction. By the operation of the electromagnet C1 the reel 22 is coupled to the shaft of this motor 64, so that the quantity of tape 2 in the container 3 is decreased. Consequently the pairs of photo-electric cells 48, 52 and 49, 53 are successively illuminated. When the photo-electric cells 48, 52 are illuminated nothing happens, but when the photo-electric cells 49, 53 are illuminated the bistable device BS4 is reset to its 0-condition and the relay $Br$ and the electromagnet C1 are both released so that both the D.C. motor 64 and the reel 22 are suddenly braked. Consequently the quantity of tape in the container 3 will again increase so that the pairs of photo-electric cells 49, 53 and 48, 52 will again be prevented from being illuminated. Thus the D.C. motor 64 will again be started etc.

Considering the container 4 it has been supposed that the photo-electric cells 57, 61 are illuminated. Due to the quantity of tape decreasing, the photo-electric cells 58, 62 are illuminated at a certain moment. Consequently the bistable device BS5 is triggered in its 1-condition via the gate G7, the inverter I3 and the mixer M4. Thus the relay *Cr* and the electromagnet C2 are operated. By the operation of the relay *Cr* the D.C. bias circuit of this magnetic amplifier circuit 86 is opened whereas its D.C. control circuit is closed. Hence the D.C. motor 63 starts rotating in clockwise direction. By the operation of the electromagnet C2 the reel 11 is coupled to the shaft of this motor 63, so that the quantity of tape in the container 4 is increased. Consequently the pairs of photo-electric cells 58, 62 and 57, 61 are successively prevented from being illuminated. When the cells 58, 62 are prevented from being illuminated nothing happens, but when the cells 57, 61 are prevented from being illuminated the bistable device BS5 is reset to its 0-condition and the relay *Cr* and the electromagnet C2 are both released so that the D.C. motor 64 and the reel 11 are suddenly braked. Consequently, the quantity of tape in the container 4 will again decrease so that the pairs of photo-electric cells 57, 61 and 58, 62 will again successively be illuminated. Thus the D.C. motor 64 will again be started, etc.

Obviously an analogous operation as the above described one takes place when the tape 2 is displaced from left to right.

It may happen that in the above described operation the reel motor 64 is not started, for one or other reason. In this case the quantity of tape in the container 3 will increase till the photo-electric cells 47, 51 are prevented from receiving light. In this case the bistable device BS3 will be triggered in its 1-condition via the gate G1 and the mixer M1 and the alarm circuit 94 will be operated. This circuit cuts the electric supply from all the motors. When in the above described operation the reel motor 63 is not started, the quantity of tape in the container 4 will decrease till the photo-electric cell 42 will receive light. In this case the above bistable device BS3 is also triggered to its 1-condition and the alarm circuit 4 is operated.

From FIG. 1 it may be seen that it is relatively difficult to introduce the tape in the large and small containers. In order that this should not be necessary each time a tape reel has to be replaced, the portion of the tape located in the machine when the reel 22 is full and the reel 11 is empty, is always maintained in the machine. The tape reels 22 and 11 may then be removed from or mounted in the machine simply by disconnecting from or sticking this portion to the ends of the tape wound on these reels.

While the principles of the invention have been described above in connection with specific apparatus, it is to be clearly understood that this description is made only by way of example and not as a limitation on the scope of the invention.

We claim:

1. A tape handling system comprising:
a processing member;
first tape driving means including first vacuum operated capstan means for moving said tape across said processing member;
second tape driving means including second and third vacuum operated capstan means for imparting to said tape a linear velocity at least equal to the linear velocity imparted to said tape by said first tape driving means;
a single tape loop producing means arranged between said first and second driving means;
a multiple tape loop producing means arranged on the other side of said second driving means; and
control means including first and second pairs of photo-electric cells and associated light sources coupled to said second tape driving means, said pairs of photocells and associated light sources being mounted at two different levels to maintain the length of said single tape loop between two predetermined values.

2. A tape handling system according to claim 1 wherein said tape driving means displace said tape across said processing member in a forward and a reverse direction and said single loop producing means produces two said single loops, one on either side of said processing member.

3. A tape handling system according to claim 2 wherein:
said first tape driving means comprises a first pair of capstans rotatable in opposite directions, one of said first pair being mounted at either side of said processing member, respectively; and
said second tape driving means comprises a second pair and a third pair of capstans, said second and third pairs being mounted between said multiple loop and a respective one of said two single loops.

4. A tape handling system according to claim 3 wherein each of said capstans is coupled to a valve means controlling the creation of a vacuum inside said capstan.

5. Tape handling system as claimed in claim 4, wherein each of said capstans comprises a permanently operated rotor and that when said valve is operated said tape is sucked against said rotor and thereby displaced.

6. Tape handling system as claimed in claim 5, further comprising first and second reels for receiving and for paying out said tape, a multiple tape loop being present between each of said reels and each of said two single tape loops.

7. Tape handling system as claimed in claim 6, wherein each said multiple tape loop is formed by a plurality of loose loops stored in a bin.

8. Tape handling system as claimed in claim 4, wherein said first and second pairs of photo-electric cells and associated light sources are coupled to said valve means for controlling the operation of the valves associated to the capstans of said second and third pairs of capstans respectively.

9. Tape handling system as claimed in claim 8, wherein the operation of each of the valves associated to the capstans of said second and third pairs of capstans is much smaller than the time required to move the lower level of each said single tape loop between said two different levels when the valve associated to one of the capstans of said first pair of capstans and the valve associated to one of the capstans of said second or third pair of capstans are operated.

10. Tape handling system as claimed in claim 7, further comprising first and second motors coupled to said first and second reels, respectively, and other control means further comprises photoelectric cells and associated light sources and mirrors, for controlling the quantity of tape of said multiple tape loop stored in each said bin by controlling the operation of the motor driving the reel associated to said multiple tape loop, that each photoelectric cell and the associated light source, on the one hand, and the associated mirror, on the other hand, are mounted on the one and other sides of the edges of said multiple tape loop in such a manner that the mirror is perpendicular to the plane of the tape and that the light emitted by said light source is able to be reflected by the associated mirror and to influence the associated photo-electric cell, and that each of the beams of said light source is located in a plane which is oblique with respect to the plane of said tape.

11. Tape handling system as claimed in claim 10, wherein each bin includes a door coupled thereto and each said mirror is mounted in a door of said bin.

12. Tape handling system as claimed in claim 6, further comprising first and second motors coupled to said reels said reel and an armature voltage supply circuit for said motor, said armature voltage supply circuit including a variable resistance for controlling the voltage applied to the armature and hence the speed of said motor, and that said variable resistance includes a plurality of permanent magnets, a plurality of reed switch contacts, a plurality of series connected resistance each of which is connected in parallel with at least one reed switch contact mounted in front of a permanent magnet, a disc being able to be displaced between the reed switch contacts and the permanent magnets so as to short-circuit or not one or more of said resistances in such a manner that said speed of said motor remains substantially constant.

13. Tape handling system as claimed in claim 12, wherein each said reed switch contact is a make contact so that when said disc is located between a said reed switch make contact and the associated permanent magnet this reed switch make contact is not closed so as not to short-circuit the associated resistance, whereas when said disc is not located between a said reed switch make contact and the associated permanent magnet this reed switch make contact is closed so as to short-circuit the associated resistance.

14. Tape handling system as claimed in claim 13, wherein said disc is so coupled to a controller arm, which senses the diameter of the web wound on said reel, that said variable resistance varies in a manner such that the speed of said motor is inversely proportional to said diameter.

15. Tape handling system as claimed in claim 12, wherein said armature voltage supply circuit comprises a magnetic amplifier and includes a variable resistance in the D.C. control circuit thereof, the outputs of said amplifier being connected to said armature of said motor.

16. Tape handling system comprising a processing member, at least one multiple tape loop, a bin for storing said multiple tape loop, tape driving means for moving said tape across said processing member, control means constituted by photo-electric cells and associated light sources and mirrors, for controlling the quantity of tape of said multiple tape loop stored in said bin, by controlling the operation of said driving means, that each photo-electric cell and the associated light source, on the one hand, and the associated mirror, on the other hand, are mounted on the one and other sides of the edges of said multiple tape loop in such a manner that the mirror is perpendicular to the plane of the tape and that the light emitted by said light source is able to be reflected by the associated mirror and to influence the associated photo-electric cell, and that each of the beams of said light source is located in a plane which is oblique with respect to the plane of said tape.

17. Speed control mechanism for a motor comprising a variable resistance for controlling the voltage applied to the armature of said motor and hence the speed thereof, a plurality of reed switch contacts, a plurality of permanent magnets, said variable resistance including a plurality of series connected resistances each of which is connected in parallel with at least one reed switch contact mounted in front of a permanent magnet, and a disc being able to be displaced between the reed switch contacts and the permanent magnets so as to short-circuit or not one or more of said resistances in such a manner that said speed of said motor remains substantially constant.

18. Speed control mechanism as claimed in claim 17, wherein each said reed switch contact is a make contact so that when said disc is located between a said reed switch make contact and the associated permanent magnet this reed switch make contact is not closed so as not to short-circuit the associated resistance, whereas when said disc is not located between a said reed switch make contact and the associated permanent magnet this reed switch make contact is closed so as to short-circuit the associated resistance.

19. Speed control mechanism as claimed in claim 18, wherein said disc is so coupled to a controller arm, which senses the diameter of the tape wound on said reel, that said variable resistance varies in a manner such that the speed of said motor is inversely proportional to said diameter.

20. Speed control mechanism as claimed in claim 17, wherein said disc is so coupled to a controller arm, which senses the diameter of the tape wound on said reel, that said variable resistance varies in a manner such that the speed of said motor is inversely proportional to said diameter.

References Cited by the Examiner

UNITED STATES PATENTS 3,016,207 2/1962 Comstock ---------- 242—55.12
3,195,791 7/1965 Gwillim ------------- 226—95

OTHER REFERENCES

IBM Technical Disclosure Bulletin, vol. 2, No. 2, August 1959, "Four Vacuum Column Tape Drive," page 8.

FRANK J. COHEN, *Primary Examiner.*